US012683383B2

(12) United States Patent
Khardawi et al.

(10) Patent No.: US 12,683,383 B2
(45) Date of Patent: Jul. 14, 2026

(54) USE OF GROUND PROTECTION OF ENERGY REDUCING MAINTENANCE SWITCH (ERMS) FOR PROTECTING CONTROLGEARS

(71) Applicant: SAUDI ARABIAN OIL COMPANY, Dhahran (SA)

(72) Inventors: Wasseem Khardawi, Dhahran (SA); Ali Hajri, Abu Ali (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 324 days.

(21) Appl. No.: 18/498,396

(22) Filed: Oct. 31, 2023

(65) Prior Publication Data

US 2025/0141215 A1 May 1, 2025

(51) Int. Cl.
| | |
|---|---|
| *H02H 3/00* | (2006.01) |
| *H02B 13/00* | (2006.01) |
| *H02B 13/035* | (2006.01) |
| *H02H 1/00* | (2006.01) |
| *H02H 7/00* | (2006.01) |
| *H02H 7/26* | (2006.01) |

(52) U.S. Cl.
CPC ............. *H02H 7/26* (2013.01); *H02B 13/005* (2013.01); *H02B 13/0356* (2013.01); *H02H 1/0007* (2013.01)

(58) Field of Classification Search
CPC ...... H02H 7/26; H02H 1/0007; H02B 13/005; H02B 13/0356
USPC .......................................................... 361/64
See application file for complete search history.

(56) References Cited

U.S. PATENT DOCUMENTS

| | | | | |
|---|---|---|---|---|
| 1,511,360 A | * | 10/1924 | Osborne .................. | B60M 1/06 |
| | | | | 307/90 |
| 6,496,342 B1 | * | 12/2002 | Horvath ............ | H02J 13/00002 |
| | | | | 361/64 |
| 7,203,040 B2 | * | 4/2007 | Shipp ....................... | H02H 9/00 |
| | | | | 361/5 |

(Continued)

FOREIGN PATENT DOCUMENTS

CN          104111403 A     10/2014

*Primary Examiner* — Crystal L Hammond
*Assistant Examiner* — Lucy M Thomas
(74) *Attorney, Agent, or Firm* — Osha Bergman Watanabe & Burton LLP

(57) ABSTRACT

A ground protection of an energy reducing maintenance switch (ERMS) system for protecting controlgears. The ground protection of the ERMS system includes a feeder, one or more controlgears operatively connected to the feeder, one or more microprocessor protection relays operatively connected to the one or more circuit breakers and the one or more controlgears. The feeder comprises one or more switchgears including a low voltage (LV) switchgear and a medium voltage (MV) switchgear, one or more circuit breakers operatively connected to the one or more switchgears, one or more transformers operatively connected to the one or more circuit breakers, and one or more boosters operatively connected to the LV switchgear. The one or more microprocessor protection relays comprises a built-in ERMS with ground protection which is activated during pre-flashover phase in the one or more controlgears to interrupt power to the one or more controlgears before any flashover occurs.

20 Claims, 6 Drawing Sheets

(56)　　　　　　References Cited

U.S. PATENT DOCUMENTS

2006/0114630 A1*　6/2006　Culligan ................ H02H 3/006
　　　　　　　　　　　　　　　　　　　　361/62
2007/0217105 A1*　9/2007　Christensen ........... H02H 3/025
　　　　　　　　　　　　　　　　　　　　361/89
2022/0131368 A1*　4/2022　Castillo ................ H02H 1/0015
2022/0149622 A1*　5/2022　Cornelius ................. H02J 3/12

* cited by examiner

USE OF GROUND PROTECTION OF ENERGY REDUCING MAINTENANCE SWITCH (ERMS) FOR PROTECTING CONTROLGEARS

BACKGROUND

The conventional energy reducing maintenance switch (ERMS) intended to protect the medium and low voltage switchgears and control gears operates once the ground fault develops into three-phase fault or phase-to-phase fault leading to a definite flashover. A definite flashover may cause serious damage to the medium and low voltage switchgears and control gears as well as hamper the revenue of the distribution company due to the outage area affected. Accordingly, there exists a need for an ERMS with ground protection set to operate during the pre-flashover phase to interrupt the power and to prevent a flashover from occurring at a very early stage when the fault starts as a ground fault in the control gears.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments disclosed herein relate to a ground protection of an energy reducing maintenance switch (ERMS) system for protecting controlgears. The ground protection of the ERMS system comprises a feeder, one or more controlgears operatively connected to the feeder; and one or more microprocessor protection relays operatively connected to the one or more circuit breakers and the one or more controlgears. The feeder comprises one or more switchgears including a low voltage (LV) switchgear and a medium voltage (MV) switchgear, one or more circuit breakers operatively connected to the one or more switchgears, one or more transformers operatively connected to the one or more circuit breakers, and one or more boosters operatively connected to the LV switchgear. The one or more microprocessor protection relays comprises a built-in ERMS with ground protection. The one or more microprocessor protection relays operate the built-in ERMS with ground protection during pre-flashover phase. During the pre-flashover phase, the ground fault starts in the one or more controlgears. The built-in ERMS with ground protection operates to interrupt power to the one or more controlgears before any flashover occurs in the one or more controlgears.

In general, in another aspect, embodiments disclosed herein relate to a method of ground protection of energy reducing maintenance switch (ERMS) system for protecting controlgears. The method comprises connecting one or more controlgears to a feeder which includes one or more switchgears including a medium voltage (MV) switchgear and a low voltage (LV) switchgear, one or more circuit breakers operatively connected to the one or more switchgears, one or more transformers operatively connected to the one or more circuit breakers, and one or more boosters operatively connected to the LV switchgear; connecting one or more microprocessor protection relays, comprising a built-in ERMS with instantaneous and time delay ground protection, to the one or more circuit breakers and the one or more controlgears; operating the built-in ERMS with ground protection during pre-flashover phase, wherein ground fault starts in the one or more controlgears during the pre-flashover phase; operating the built-in ERMS with ground protection to interrupt power to the one or more controlgears before any flashover occurs in the one or more controlgears; and deactivating the built-in ERMS with ground protection once the ground fault is cleared to adjust back the protection speed.

Other aspects and advantages of the claimed subject matter will be apparent from the following description and the appended claims.

DETAILED DESCRIPTION

Figure 1:
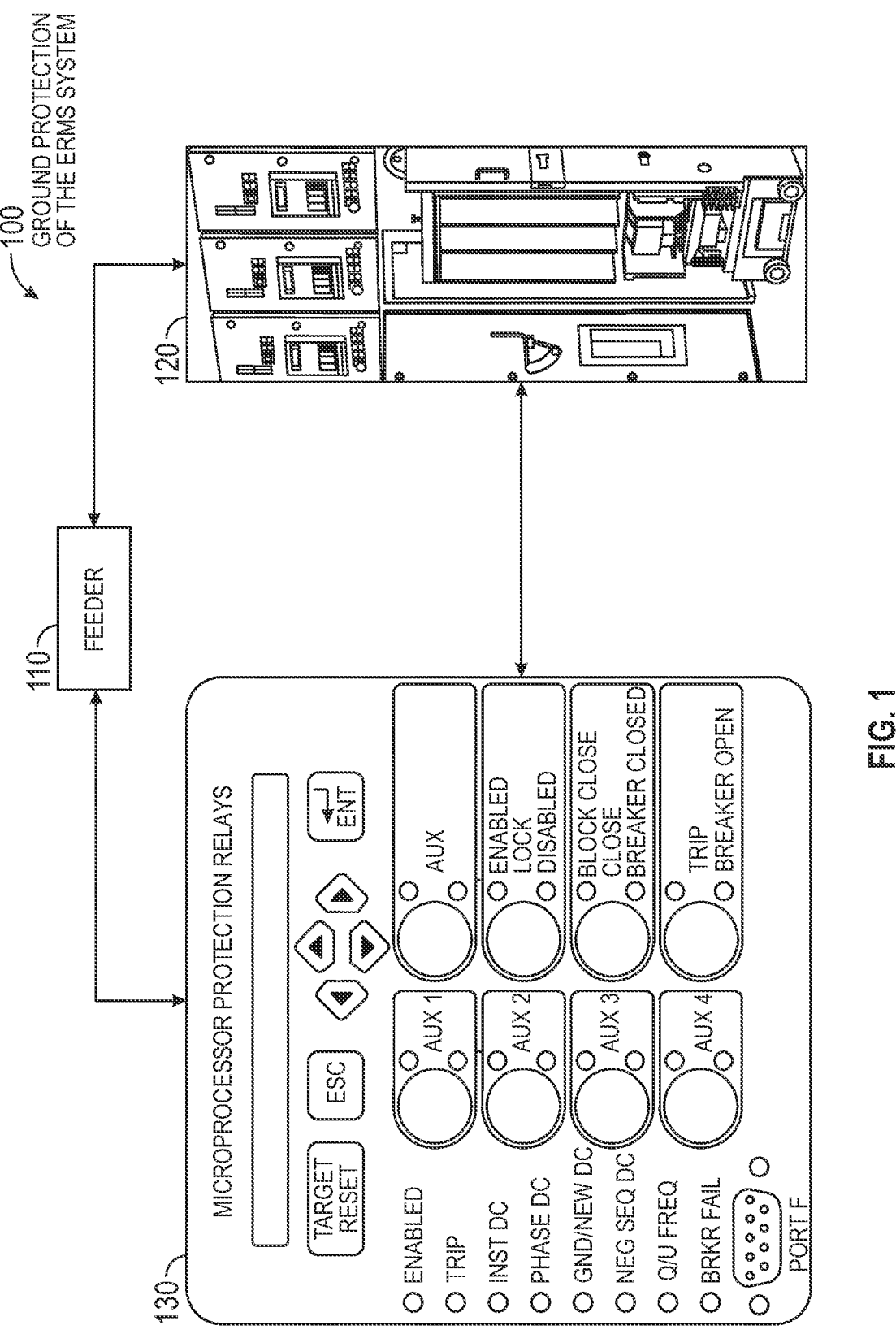
FIG. 1 shows an overview of a ground protection of an energy reducing maintenance switch (ERMS) system for protecting controlgears in accordance with one or more embodiments of the disclosure.

Specific embodiments of the present disclosure will now be described in detail below with reference to the accompanying drawings. Like elements in the various figures are denoted by like reference numerals for consistency.

In the following detailed description of embodiments of the disclosure, numerous specific details are set forth to provide a more thorough understanding of the invention. However, it will be apparent to a person having ordinary skill in the art that the invention may be practiced without these specific details. In other instances, well-known features have not been described in detail to avoid unnecessarily complicating the description.

Throughout the application, ordinal numbers (e.g., first, second, third) may be used as an adjective for an element (e.g., any noun in the application). The use of ordinal numbers is not intended to imply or create a particular ordering of the elements nor to limit any element to being only a single element unless expressly disclosed, such as using the terms "before," "after," "single," and other such terminology. Rather the use of ordinal numbers is to distinguish between the elements. By way of an example, a first element is distinct from a second element, and the first element may encompass more than one element and may succeed (or precede) the second element in an ordering of elements.

In general, embodiments of the disclosure provide a system and a method of ground protection of an energy reducing maintenance switch (ERMS) for protecting controlgears. As used herein, the term "controlgears" is intended to be general and is used to refer to "controlgears," "switchgears," or the like. A detailed description is subsequently provided in reference to the figures. Embodiments of the disclosure provide an enhancement to the operation of existing ERMS intended to protect the medium and low voltage switchgears and controlgears. Embodiments of the disclosure may prevent a flashover from occurring at a very early stage when the fault starts as a ground fault in the controlgears. The ERMS system may be applied to any circuit breaker in medium voltage switchgear whether it is incomer circuit breaker or feeder circuit breaker of the load type.

FIG. 1 shows an overview of a ground protection of an energy reducing maintenance switch (ERMS) system for protecting controlgears in accordance with one or more embodiments of the disclosure. The ground protection of the ERMS system 100 comprises a feeder 110, one or more controlgears 120 operatively connected to the feeder 110, and one or more microprocessor protection relays 130 operatively connected to the feeder 110 and the one or more controlgears 120. Each of these components is subsequently described in detail with reference to FIGS. 2-3.

Figure 2:
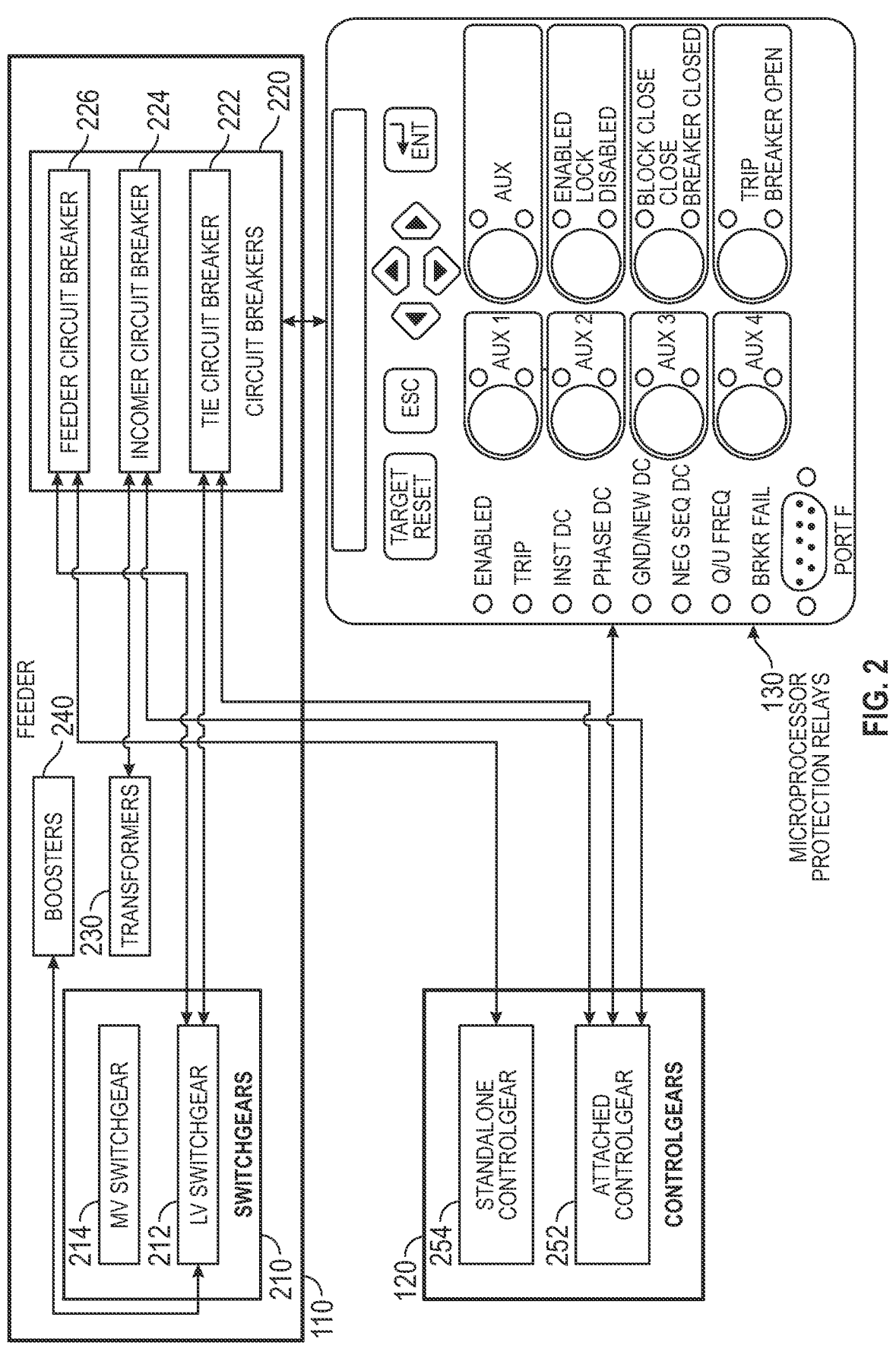
FIG. 2 shows a block diagram of a feeder of the ground protection of the ERMS system for protecting control gears in accordance with one or more embodiments of the disclosure.

FIG. 2 shows a block diagram of a feeder of the ground protection of ERMS system for protecting controlgears in accordance with one or more embodiments of the disclosure. The feeder 110 comprises one or more switchgears 210, one or more circuit breakers 220 operatively connected to the one or more switchgears 210, one or more transformers 230 operatively connected to the one or more circuit breakers 220, and one or more boosters 240 operatively connected to the one or more switchgears 210. Each of these components is subsequently described in detail.

The one or more switchgears 210 includes a low voltage (LV) switchgear 212 and a medium voltage (MV) switchgear 214. The one or more switchgears 210, depending upon their application, may be without an enclosure (open type) or completely enclosed (metal enclosed type) on all sides by sheet metal except for the operating handles, knobs, instruments, and inspection windows. The one or more switchgears 210 may also be fixed-type construction in which all the feeders in the switchboard are securely mounted in the assembly and rigidly connected to the main bus or draw-out construction in which each feeder is mounted on a separate withdrawable chassis.

The one or more circuit breakers 220 comprises a tie circuit breaker 222, an incomer circuit breaker 224, and a feeder circuit breaker 226. The incomer circuit breaker 224 is operatively connected to the attached controlgear 252 and a secondary side of the one or more transformers 230. The tie circuit breaker 222 is operatively connected to the attached controlgear 252 and the LV switchgear 212. The feeder circuit breaker 226 is operatively connected to the standalone controlgear 254 and the LV switchgear 212.

The one or more transformers 230 are used to transfer power, by electromagnetic induction, from one voltage level (the primary winding) to a second voltage level (the secondary winding). The secondary voltage may be higher or lower than the primary voltage level. For example, one or more transformers 230 may be current transformers (CTs) used to provide low voltage, low power inputs to the one or more microprocessor protection relays 130.

The one or more boosters 240 may keep the voltage at the feeding point constant. For example, each of the one or more boosters 240 may be a series-wound booster consisting of a single generator. The field winding of the one or more boosters 240 may be such as to compensate for the drop in both the positive and return of the feeder 110, and it may be wound to over-compensate for this drop, and therefore to compensate wholly or partially for the drop in the distributors themselves.

The one or more controlgears 120 comprises an attached controlgear 252 and a standalone controlgear 254. The one or more controlgears 120, depending upon their application, may be without an enclosure (open type) or completely enclosed (metal enclosed type) on all sides by sheet metal except for the operating handles, knobs, instruments, and inspection windows. The one or more controlgears 120 may also be fixed-type construction in which all the feeders in the switchboard are securely mounted in the assembly and rigidly connected to the main bus or draw-out construction in which each feeder is mounted on a separate withdrawable chassis.

Figure 3:
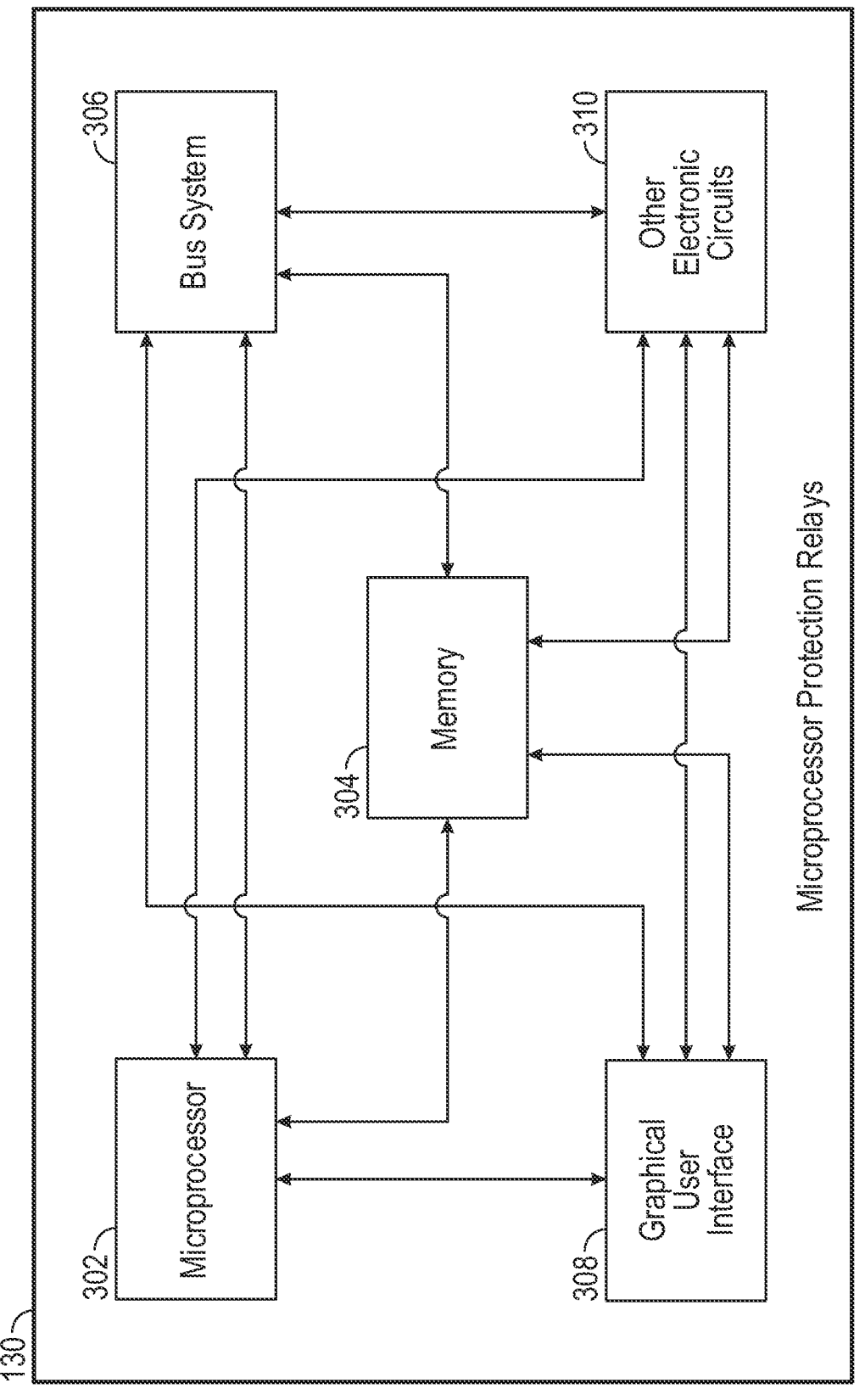
FIG. 3 shows a block diagram of a microprocessor protection relay of the ground protection of the ERMS system for protecting control gears in accordance with one or more embodiments of the disclosure.

FIG. 3 shows a block diagram of a microprocessor protection relay of the ground protection of ERMS system for protecting control gears in accordance with one or more embodiments of the disclosure. The one or more microprocessor protection relays 130 comprise a built-in ERMS with ground protection. During the pre-flashover phase characterized by the start of a ground fault in the one or more controlgears, the one or more microprocessor protection relays 130 operate the built-in ERMS with ground protection to interrupt power to the one or more controlgears before any flashover occurs in the one or more controlgears.

During a ground fault, the current will flow through the grounding grid and cause its potential to rise with respect to a remote ground. Faults (i.e., short circuits) may be very dangerous conditions because the amount of energy converted from electrical energy to thermal energy can be substantial. If a high current fault occurs in a substation, individuals working near the fault may sustain severe skin burns unless they are wearing appropriate personnel protective equipment.

Single phase-to-ground faults are short circuits between any single conductor of a three-phase power system and ground. At the location of a phase-to-ground fault, the voltage (to ground) on one of the phases will be depressed and the current in that phase and in the ground path will be higher than the current in the other phases.

Double phase-to-ground faults are short circuits between any pair of the three conductors of a three-phase power system and ground. At the location of a phase-to-phase-to-ground fault, the voltage (to ground) on two of the three phases will be depressed and the current in the faulted phases and the ground path will be higher than the current in the third phase.

The one or more microprocessor protection relays 130 are specifically designed to detect abnormal power system conditions (e.g., ground faults) and to initiate appropriate power system changes. The one or more microprocessor protection relays 130 may be located in central control cubicles or in individual relay cabinets located throughout a substation. The input currents of the one or more microprocessor protection relays 130 are reduced from the power system levels through the use CTs.

The function of one or more microprocessor protection relays 130 is to initiate the opening of the one or more circuit breakers 220. The one or more microprocessor protection relays 130, by themselves, cannot cause the one or more circuit breakers 220 to open or close. The one or more microprocessor protection relays 130 complete the control circuit from a battery to a trip coil of the one or more circuit breakers 220.

When the trip coil of the one or more circuit breakers 220 is energized, the working mechanism of the one or more circuit breakers 220 is activated. The position switch of the one or more circuit breakers 220 interrupts current through the trip coil when the of the one or more circuit breakers 220 are open. The one or more microprocessor protection relays 130 are responsible for the activation of the trip circuit and the faulty section is isolated by the one or more circuit breakers 220.

When a ground fault is detected during pre-flashover phase in the one or more controlgears 120 or in the switchgears 210 while the built-in ERMS with ground protection is activated, the one or more microprocessor protection relays 130 analyze operating conditions on the one or more controlgears 120 and trip the one or more circuit breakers 220. The one or more microprocessor protection relays 130 are designed to detect abnormal or undesirable situations (e.g., ground faults) in the one or more controlgears 120 or switchgears 210 and deliver a tripping signal to the one or more circuit breakers 220, isolating the affected area as quickly as possible without affecting adjacent areas. The one or more microprocessor protection relays 130 deactivate the built-in ERMS with ground protection once the ground fault is cleared to adjust back the protection speed.

The one or more microprocessor protection relays 130 comprise a microprocessor 302, a memory 304, a bus system 306, a graphical user interface (GUI) 308, and other electronic circuits 310. Each of these components is subsequently described in detail. The one or more microprocessor protection relays 130 may be programmed for a normal operation setting and a built-in ERMS with ground protection activation setting. The normal operation setting is characterized by the microprocessor 302 having a time delay curve to operate and trip the one or more circuit breakers 220 which allow the ground fault to develop into a three-phase fault or a phase-to-phase fault that will lead to definite flashover. The built-in ERMS with ground protection activation setting is characterized by an operator who manually activates the built-in ERMS with ground protection for the maintenance of the one or more controlgears 120 or switchgears 210 and the microprocessor 302 tripping the one or more circuit breakers 220. The one or more microprocessor protection relays 130 may activate the built-in ERMS with ground protection in the normal operation setting.

The microprocessor 302 performs the timing and control of the of the ground protection of the ERMS system 100 and carries out all arithmetic and logical operations of the ground protection of the ERMS system 100. For example, the microprocessor 302 may be a central processing unit (CPU). Upon detecting and locating the ground fault in the one or more controlgears 120 or in the one or more switchgears 210 the microprocessor 302 trips the one or more circuit breakers 220 at an early stage of the ground fault and interrupts the power before any flashover occurs and hence prevents any injury, fatality, or equipment damage. The microprocessor 302 deactivates the built-in ERMS with ground protection once the ground fault is cleared to adjust back the protection speed.

During maintenance in the one or more controlgears 120 or in the one or more switchgears 210, an operator activates the built-in ERMS with ground protection using a dedicated manual switch located at a circuit breaker door in a separate panel 10 meters away from the one or more circuit breakers 220 or using one of the programmed pushbuttons of the ore or more microprocessor relays 130. Once the built-in ERMS with ground protection is activated by the operator, the microprocessor 302 trips the one or more circuit breakers 220. The built-in ERMS with ground protection is deactivated by the operator once the maintenance is completed to adjust back the protection speed.

Upon detecting and locating the ground fault in the attached controlgear 252, the microprocessor 302 activates the built-in ERMS with ground protection. Once the built-in ERMS with ground protection is activated, the microprocessor 302 trips the incomer circuit breaker 224 and the tie circuit breaker 222. The microprocessor 302 deactivates the built-in ERMS with ground protection once the ground fault is cleared to adjust back the protection speed. During maintenance of the attached controlgear 252, the operator activates the built-in ERMS with ground protection. Once the built-in ERMS with ground protection is activated, the microprocessor 302 trips the incomer circuit breaker 224 and the tie circuit breaker 222. The built-in ERMS with ground protection is deactivated by the operator once the maintenance is terminated to adjust back the protection speed.

Upon detecting and locating the ground fault in the standalone controlgear 254, the microprocessor 302 activates the built-in ERMS with ground protection. Once the built-in ERMS with ground protection is activated, the microprocessor 302 trips the feeder circuit breaker 226. The microprocessor 302 deactivates the built-in ERMS with ground protection once the ground fault is cleared to adjust back the protection speed.

During maintenance in the standalone controlgear 254, the operator activates the built-in ERMS with ground protection. Once the built-in ERMS with ground protection is activated, the microprocessor 302 trips the feeder circuit breaker 226. The built-in ERMS with instantaneous ground protection is deactivated by the operator once the maintenance activity is completed to adjust back the protection speed.

The memory 304 may be a read only memory (ROM) for dedicated applications or random access memory (RAM) for the storage of data and programs, or a combination of both. The memory 304 stores a program to be executed and the data relevant to a specific task.

The bus system 306 permits communication of the microprocessor 302 with the memory 304. The bus system 306 also permits communication of the microprocessor 302 with the GUI 308. For example, the bus system 306 may comprise a data bus, a timing and control bus, and an address bus.

The GUI 308 makes possible the transfer of data and control signals to and from the system. For example, the GUI 308 may be a touchscreen display with front-panel operator control pushbuttons. The operator control pushbuttons may comprise close and trip operator control pushbuttons which are programmed to close and open the one or more circuit breakers 220.

The other electronic circuits 310 may comprise high-impedance fault (HIF) detection element to detect small current ground faults, built-in impedance-based fault location, built-in metering and monitoring functions for post-fault diagnostics.

Figure 4A:
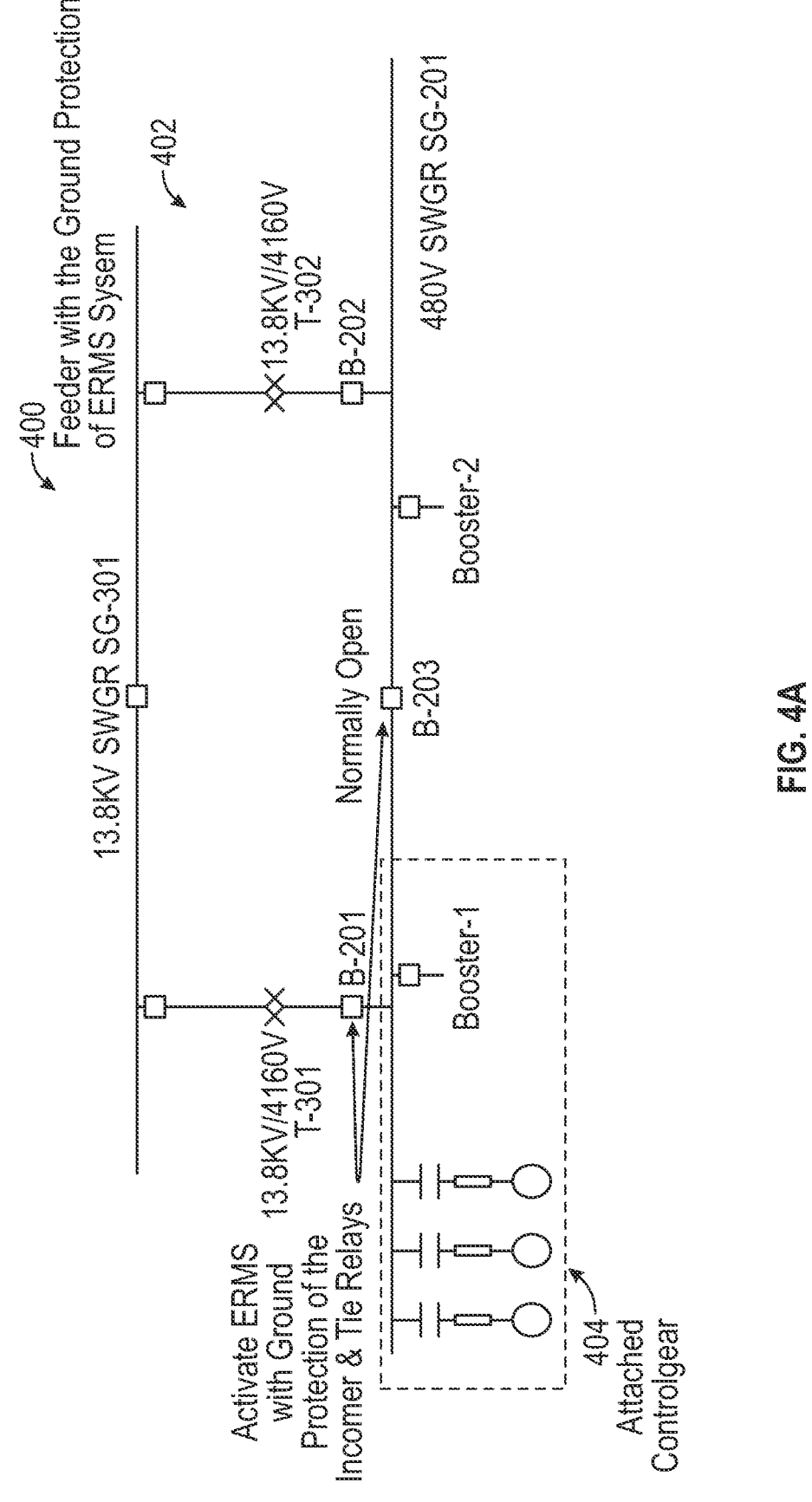
FIGS. 4A-4B show an example of a circuit of the feeder of the ground protection of the ERMS system for protecting control gears in accordance with one or more embodiments of the disclosure.
Figure 4B:
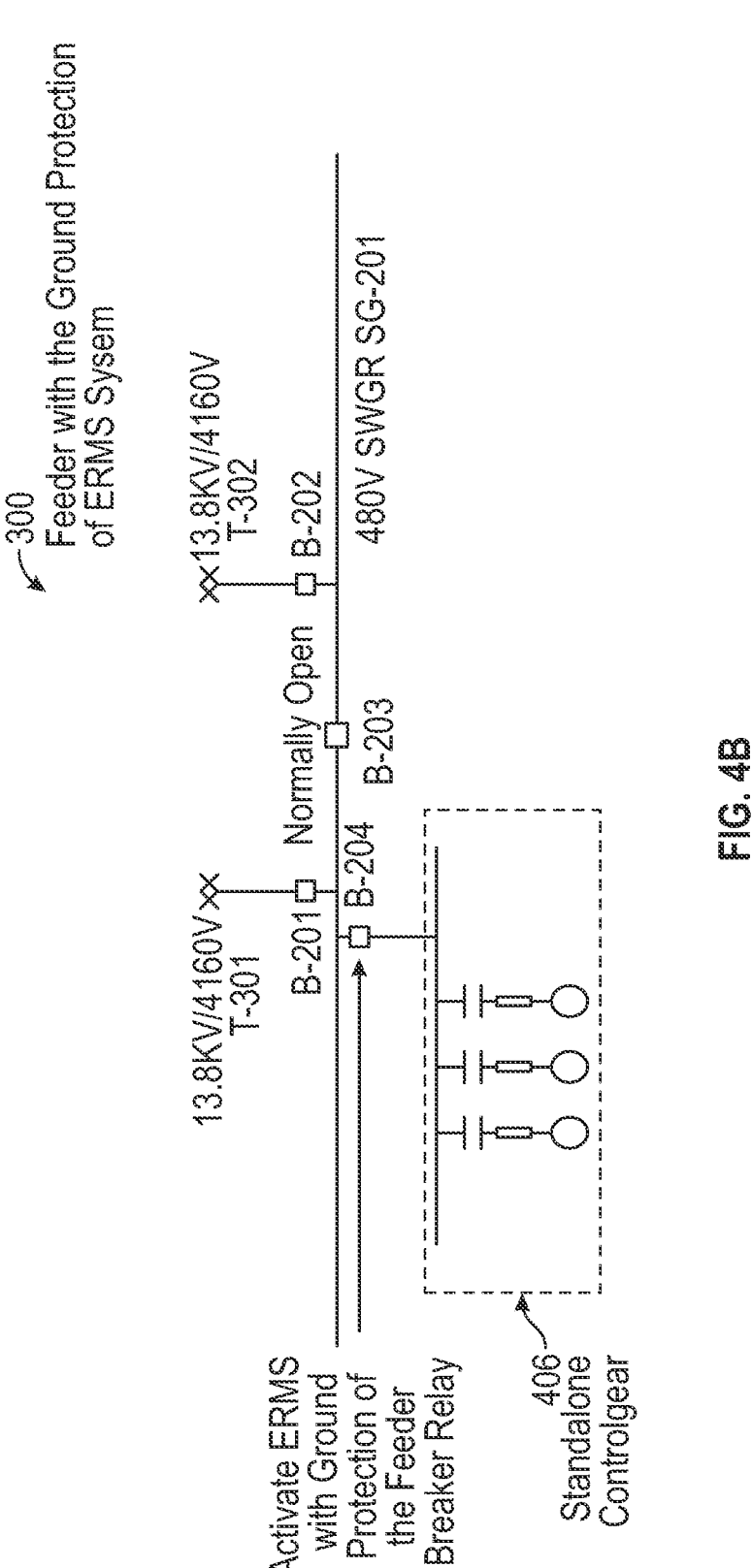

FIGS. 4A-4B show an example of a circuit of the feeder of the ground protection of ERMS system for protecting control gears in accordance with one or more embodiments of the disclosure. FIG. 4A and FIG. 4B show that the feeder of the ground protection of ERMS system 400 comprises a feeder 402; an attached controlgear 404 and a standalone controlgear 406 operatively connected to the feeder 402; and one or more microprocessor protection relays associated with an incomer circuit breaker B-201, a tie circuit breaker B-203, and a feeder circuit breaker B-204. The one or more microprocessor protection relays are operatively connected to the feeder 402, the attached controlgear 404, and the standalone controlgear 406.

The feeder 402 comprises a 13.8 KV switchgear SG-301 (MV switchgear) and a 480V switchgear SG-201 (LV switchgear); an incomer circuit breaker B-201, a tie circuit breaker B-203, and a feeder circuit breaker B-204 operatively connected to the 480V switchgear SG-201 and the 480V switchgear SG-201; two parallel 13.8 KV/4160 kV transformers T-301 and T-302 operatively connected to the incomer circuit breaker B-201 and the circuit breaker B-202, respectively; a booster 1 and a booster 2 operatively connected to the 480V switchgear SG-201.

The incomer circuit breaker B-201 is operatively connected to the attached controlgear 404 and a secondary side of the left 13.8 KV/4160 kV transformer T-301. The tie circuit breaker B-203 is operatively connected to the attached controlgear 404 and the 480V switchgear SG-201. The feeder circuit breaker B-204 is operatively connected to the standalone controlgear 406 and the 480V switchgear SG-201.

Figure 5:
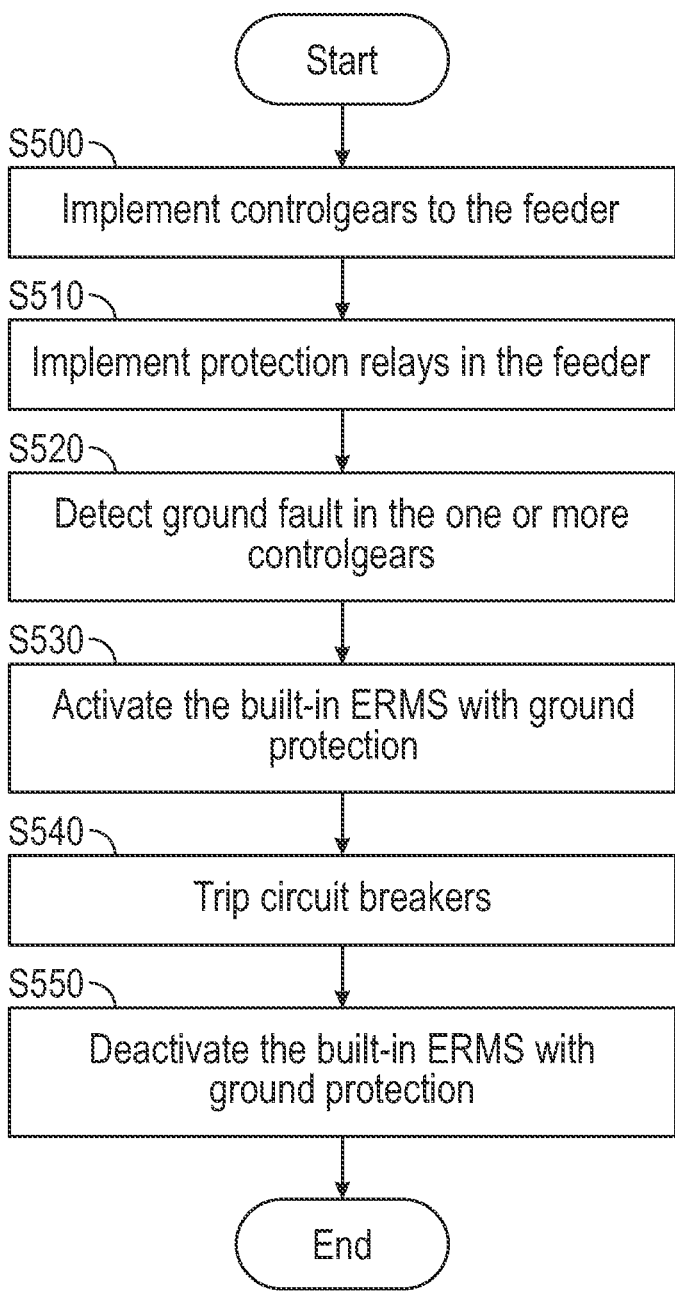
FIG. 5 shows a flowchart for a process of the instantaneous and time delay ground protection of the ERMS for protecting control gears in accordance with one or more embodiments of the disclosure.

FIG. 5 shows a flowchart for a process of ground protection of ERMS for protecting control gears in accordance with one or more embodiments of the disclosure. The process of ground protection of ERMS for protecting control gears may be performed by the microprocessor 302 of the one or more microprocessor protection relays 130 shown in FIG. 3.

In step S500, one or more controlgears operatively connected to the feeder are implemented. The one or more controlgears comprise an attached controlgear and a standalone controlgear.

In step S510, the microprocessor protection relays operatively connected to one or more circuit breakers of the feeder and the one or more controlgears are implemented. The one or more circuit breakers comprise a tie circuit breaker, an incomer circuit breaker, and a feeder circuit breaker. The incomer circuit breaker is operatively connected to the attached controlgear and a secondary side of the one or more transformers of the feeder. The tie circuit breaker is operatively connected to the attached controlgear and the LV switchgear of the feeder. The feeder circuit breaker is operatively connected to the standalone controlgear and the LV switchgear.

In step S520, a ground fault is detected during pre-flashover phase in the one or more controlgears. The one or more microprocessor protection relays 130 detect the ground fault and analyze the operating conditions on the one or more controlgears.

In step S530, upon detecting and locating the ground fault in the one or more controlgears, the microprocessor of the one or more microprocessor protection relays activates the built-in ERMS with ground protection. The microprocessor 302 delivers a tripping signal to the one or more circuit breakers 220, isolating the affected area as quickly as possible without affecting adjacent areas.

During maintenance of the one or more controlgears 120 or in the one or more switchgears 210, the operator activates the built-in ERMS with ground protection. Once the built-in ERMS with ground protection is activated, the one or more microprocessor protection relays 130 delivers a tripping signal to the one or more circuit breakers 220, isolating the affected area as quickly as possible without affecting adjacent areas.

In step S540, upon receiving the tripping signal from the microprocessor 302, the trip coil of the one or more circuit breakers 220 is energized and the working mechanism of the one or more circuit breakers 220 is activated to trip the one or more circuit breakers 220. The position switch of the one or more circuit breakers 220 interrupts current through the trip coil when the of the one or more circuit breakers 220 are open.

In step S550, the microprocessor 302 deactivates the built-in ERMS with ground protection and delivers a closing signal to the one or more circuit breakers 220 once the ground fault is cleared to adjust back the protection speed.

Once the maintenance in the one or more controlgears 120 or in the one or more switchgears 210 is terminated, the operator deactivates the built-in ERMS with ground protection. Once the built-in ERMS with ground protection is deactivated, the microprocessor 302 delivers a closing signal to the one or more circuit breakers 220 to adjust back the protection speed.

Embodiments of the present disclosure may provide at least one of the following advantages. Embodiments of the disclosure may prevent further development of ground phase fault into phase-to-phase fault or three-phase fault and hence the occurrence of a flashover resulting in injury, fatality, or equipment damage.

Phase-to-phase faults are short circuits between any pair of the three conductors of a three-phase power system. At the location of a phase-to-phase fault, the voltage on two of the three phases will be depressed and the current in the faulted phases will be higher than the current in the third phase. Three-phase faults are short circuits between the three conductors of a three-phase power system. At the location of a three-phase fault, the voltage of each phase will be depressed and the current will be greater than load current. Embodiments of the present disclosure may also provide microprocessor protection relays which allow to record and then replay modes preceding and functioning during failures, for analysis of emergency situations, to provide all the information regarding the state of the microprocessor protection relays to remote dispatching centers through special communication channels.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112 (f) for any limitations of any of the claims herein, except for those in which the claim expressly uses the words 'means for' together with an associated function.

What is claimed is:

1. A ground protection of an energy reducing maintenance switch (ERMS) system for protecting a controlgear, the ground protection of the ERMS system comprising:
  a feeder comprising:
    switchgears comprising a low voltage (LV) switchgear and a medium voltage (MV) switchgear,
    a circuit breaker operatively connected to the switchgears,
      wherein the circuit breaker comprises a trip coil;

a transformer operatively connected to the circuit breaker, and a booster operatively connected to the LV switchgear;

the controlgear operatively connected to the feeder; and a microprocessor protection relay, the microprocessor protection relay comprising:

a built-in ERMS with ground protection, wherein the microprocessor protection relay is operatively connected to the circuit breaker and the controlgear, wherein the microprocessor protection relay operates the built-in ERMS with ground protection during a pre-flashover phase by energizing the trip coil to activate the circuit breaker, wherein, in the pre-flashover phase, a ground fault starts in the controlgear, and wherein the circuit breaker operates to interrupt a current to the controlgear before any flashover occurs in the controlgear.

2. The ground protection of the ERMS system according to claim 1, wherein the controlgear comprises an attached controlgear and a standalone controlgear.

3. The ground protection of the ERMS system according to claim 2, wherein the circuit breaker comprise a tie circuit breaker, an incomer circuit breaker, and a feeder circuit breaker.

4. The ground protection of the ERMS system according to claim 3, wherein the incomer circuit breaker is operatively connected to the attached controlgear and a secondary side of the transformer.

5. The ground protection of the ERMS system according to claim 3, wherein the tie circuit breaker is operatively connected to the attached controlgear and the LV switchgear.

6. The ground protection of the ERMS system according to claim 3, wherein the feeder circuit breaker is operatively connected to the standalone controlgear and the LV switchgear.

7. The ground protection of the ERMS system according to claim 3, wherein the microprocessor protection relay comprises:

a microprocessor configured to:

perform timing and control of the ground protection of the ERMS system, and carry out arithmetic and logical operations of the ground protection of the ERMS system;

a memory configured to store a program and data relevant to a specific task;

a graphical user interface (GUI) configured to transfer data and control signals to and from the ground protection of the ERMS system;

a bus system configured to permit communication of:

the microprocessor with the memory, and the microprocessor with the GUI; and an electronic circuit comprising high-impedance fault (HIF) detection element to detect small current ground faults, built-in impedance-based fault location, built-in metering and monitoring functions for post-fault diagnostics.

8. The ground protection of the ERMS system according to claim 7, wherein upon detecting and locating the ground fault in the controlgear, the microprocessor:

activates the built-in ERMS with ground protection, trips the circuit breaker, and deactivates the built-in ERMS with ground protection once the ground fault is cleared to adjust back protection speed; and wherein during maintenance in the controlgear, an operator:

activates the built-in ERMS with ground protection, trips the circuit breaker; and the operator deactivates the built-in ERMS with ground protection operator once the maintenance is completed to adjust back protection speed.

9. The ground protection of the ERMS system according to claim 8, wherein upon detecting and locating the ground fault in the attached controlgear, the microprocessor trips the incomer circuit breaker and the tie circuit breaker; and wherein during maintenance of the attached controlgear, the operator trips the incomer circuit breaker and the tie circuit breaker.

10. The ground protection of the ERMS system according to claim 8, wherein upon detecting and locating the ground fault in the standalone controlgear, the microprocessor trips the feeder circuit breaker; and wherein during maintenance of the standalone controlgear, the operator trips the feeder circuit breaker.

11. A method of ground protection of energy reducing maintenance switch (ERMS) system for protecting a controlgear, the method comprising:

connecting the controlgear to a feeder, wherein the feeder comprises:

switchgears including a medium voltage (MV) switchgear and a low voltage (LV) switchgear, a circuit breaker operatively connected to the switchgears, wherein the circuit breaker comprises a trip coil;

a transformer operatively connected to the circuit breaker, and a booster operatively connected to the LV switchgear;

connecting a microprocessor protection relay, comprising a built-in ERMS with ground protection, to the the circuit breaker and the controlgear;

operating, using the microprocessor protection relay to energize the trip coil to activate the circuit breaker, the built-in ERMS with ground protection during pre-flashover phase, wherein ground fault starts in the controlgear during the pre-flashover phase; and operating the circuit breaker to interrupt a current to the controlgear before any flashover occurs in the controlgear; and deactivating the built-in ERMS with ground protection once the ground fault is cleared to adjust back protection speed.

12. The method according to claim 11, wherein the controlgear comprises an attached controlgear and a standalone controlgear.

13. The method according to claim 12, wherein the circuit breaker comprises an incomer circuit breaker, a tie circuit breaker, and a feeder circuit breaker.

14. The method according to claim 13, further comprises connecting the incomer circuit breaker to the attached controlgear and a secondary side of the transformer.

15. The method according to claim 13, further comprises connecting the tie circuit breaker to the attached controlgear and the LV switchgear.

16. The method according to claim 13, further comprises connecting the feeder circuit breaker to the standalone controlgear and the LV switchgear.

17. The method according to claim 13, further comprises:

timing and controlling the ERMS system by a microprocessor of the microprocessor protection relay;

carrying out arithmetic and logical operations of the ERMS system by the microprocessor;

storing a program and data relevant to a specific task by a memory of the microprocessor protection relays;

transferring data and control signals to and from the ERMS system by a graphical user interface (GUI) of the microprocessor protection relay;

permitting communication of:

the microprocessor with the memory, and the microprocessor with the GUI;

detecting small current ground faults by high-impedance fault (HIF) detection element;

locating ground faults by built-in impedance-based fault location; and metering and monitoring ground faults by built-in metering and monitoring functions.

18. The method according to claim 17, the method further comprises:

upon detecting and locating the ground fault in the controlgear:

activating the built-in ERMS with ground protection by the microprocessor, tripping the circuit breaker by the microprocessor,

deactivating the built-in ERMS with ground protection by the microprocessor once the ground fault is cleared to adjust back the protection speed;

during maintenance in the controlgears:

activating the built-in ERMS with ground protection by an operator, tripping the circuit breaker by the operator; and deactivating the built-in ERMS with ground protection, by the operator, once the maintenance is completed to adjust back protection speed.

19. The method according to claim 18, further comprises:

tripping the incomer circuit breaker and the tie circuit breaker, by the microprocessor, upon detecting and locating the ground fault in the attached controlgear; and tripping the incomer circuit breaker and the tie circuit breaker, by the operator, during maintenance of the attached controlgear.

20. The method according to claim 18, further comprises:

tripping the feeder circuit breaker, by the microprocessor, upon detecting and locating the ground fault in the standalone controlgear; and tripping the feeder circuit breaker, by the operator, during maintenance of the attached controlgear.

* * * * *